Figure 1:
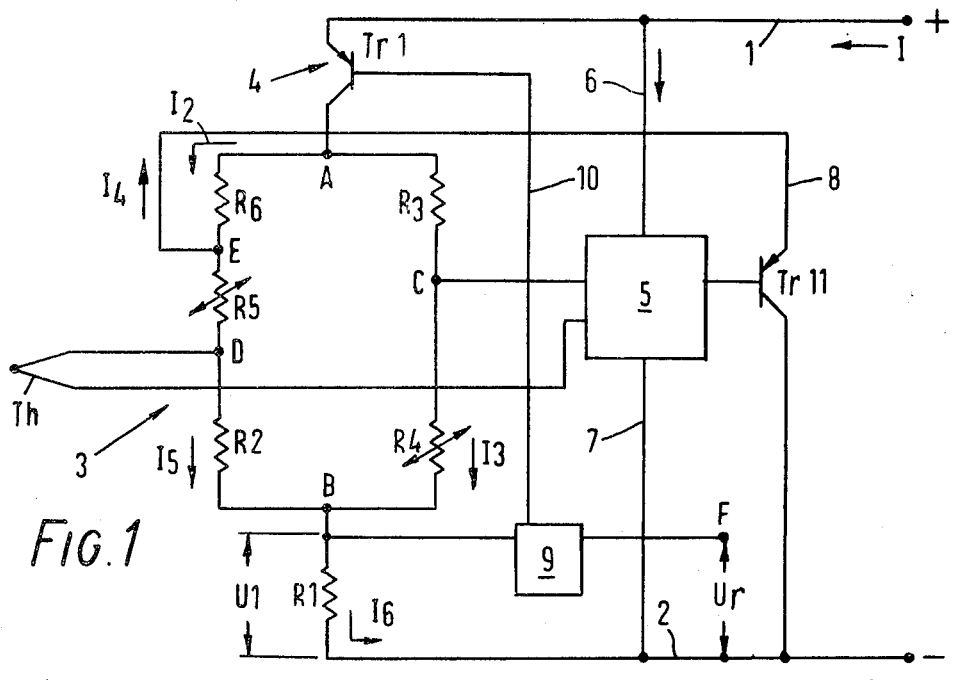

United States Patent [19]
Knudsen

[11] 3,898,554
[45] Aug. 5, 1975

[54] MEASURED-VALUE TRANSDUCER WITH A COMPENSATING BRIDGE CIRCUIT

[75] Inventor: Ole Friis Knudsen, Sonderborg, Denmark

[73] Assignee: Danfoss A/S, Nordborg, Denmark

[22] Filed: Nov. 14, 1973

[21] Appl. No.: 415,569

[30] Foreign Application Priority Data
Nov. 16, 1972 Germany............................ 2256197

[52] U.S. Cl. .............. 323/40; 323/75 A; 323/75 H; 323/75 N; 324/DIG. 1; 340/177 R; 340/186; 340/233
[51] Int. Cl. ............................................. G05f 1/58
[58] Field of Search ............ 324/DIG. 1; 323/4, 40, 323/75 A, 75 C, 75 H, 75 N; 340/177 R, 186, 233

[56] References Cited
UNITED STATES PATENTS
| | | |
|---|---|---|
| 3,324,378 | 6/1967 | Kupferberg et al................... 323/40 |
| 3,450,978 | 6/1969 | Norman......................... 324/DIG. 1 |
| 3,495,159 | 2/1970 | Smith.............................. 323/75 H |
| 3,602,832 | 8/1971 | Raymond............................. 323/40 |
| 3,614,598 | 10/1971 | Meyer............................... 323/75 H |
| 3,623,140 | 11/1971 | Nercessian...................... 323/40 X |

Primary Examiner—Gerald Goldberg

[57] ABSTRACT

A measuring transducer circuit arrangement comprises a bridge circuit across one diagonal of which the transducer and a measuring amplifier are connected, and the other diagonal of which has a current regulator connected to one terminal adjacent to a compensating resistor in the bridge and a further resistor connected to the other terminal. The current regulator is controlled in dependence on the voltage across the further resistor to maintain this voltage constant.

6 Claims, 2 Drawing Figures

MEASURED-VALUE TRANSDUCER WITH A COMPENSATING BRIDGE CIRCUIT

The invention relates to a measured-value transducer with a compensating bridge circuit, especially for two-line telemetering systems, in which transducer the input of a measuring amplifier, which allows a compensating current to flow through a compensating resistor of the bridge circuit, is connected into the bridge diagonal, and in which a common D.C. voltage supply is provided for the bridge circuit and the measuring amplifier, and a resistor arrangement is disposed in series with the bridge circuit.

In a known measured-value transducer of this kind ("Control and Instrumentation," February 1972, page 34), a thermocouple element is provided as a measuring sensor and is connected in series with the input of the measuring amplifier in the bridge diagonal. A bias resistor is connected in series with the bridge circuit on one side, and a temperature compensating diode on the other side. The bridge voltage is determined by a Zener diode. The measuring amplifier takes the form of a chopper amplifier. Its output current together with the bridge current is passed through a transformer to a two-line measuring circuit. The compensating resistor of the bridge circuit is contained in a feedback circuit which, with the aid of transformer coupling means, supplies a current proportional to the output current.

In this circuit two electrically separated voltage sources, here constituted by transformers, are necessary in order to produce the bridge current and the compensating current. This involves increased expense. Furthermore, the operating voltage of the bridge is relatively high as a result of the Zener voltage. Since the measuring voltage is very small in comparison, correspondingly pronounced interference, especially thermal interference, is observed in the bridge circuit.

Also, Archiv fur Technisches Messen (ATM); Sheet J 2402/3 April 1958, page 78, discloses the idea of supplying a bridge circuit with constant current, of supplying a thermoelectric voltage in opposition to the diagonal voltage, and of determining the deviation from the required temperature value by means of the remaining difference in temperature. Two temperature-responsive resistors are connected into two diagonally opposite branches of the bridge in order to offset changes in the ambient temperature.

The object of the present invention is to provide a measured-value transducer of the initially described kind which has greater accuracy and uses a single voltage source for the bridge circuit and the compensating circuit.

According to the invention, this object is achieved by including a current regulator in the series circuit on that side of the bridge circuit remote from the resistor arrangement, which current regulator is adjacent the compensating resistor, is disposed in the loop through which the compensating current flows, and is controlled in dependence upon the voltage-drop at a resistor in the resistor arrangement in such manner that this voltage-drop remains constant.

In this measured-value transducer, the current regulator ensures that the bridge current flowing through the entire bridge circuit has a required value. In particular it can be kept constant with great accuracy. Without interfering with this regulating function, the compensating current is also passed through the current regulator, so that the compensating current and the bridge current can be of the same voltage. Since the operating voltage of the bridge is not determined by a Zener voltage, it can be very low. Interference, particularly temperature dependent interference, which always stands in a certain percentage relationship to the bridge voltage, is correspondingly small so that more accurate results are obtained in the measurements. In particular, when deciding the operating voltage of the bridge, it is not necessary to take into account the bias voltage of the measuring amplifier since, by means of the resistor arrangement and the current regulator, the voltage level in the bridge diagonal can be kept at a value that can be used for operating the measuring amplifier.

The very low operating voltage of the bridge offers the advantage that measuring results of sufficient accuracy can be obtained with very low bridge currents, e.g. 50 $\mu$A. Conversely, with higher currents, e.g. 4mA, relatively small bridge resistors can be used. Thus, if use is made of a temperature-responsive sensing resistor, in the order of magnitude of 100 Ohms, arranged in one of the branches of the bridge, it is possible to use fixed bridge resistors of the same order of magnitude.

A particularly simple arrangement is achieved in the resistor arrangement consists simply of a bias resistor which is so rated that the bridge circuit is raised approximately to the level of the bias voltage of the input of the measuring amplifier by the constant voltage-drop occurring at the resistor. In this arrangement, not only is the increase in voltage achieved with the aid of a single resistor, but it also becomes possible to tap off the voltage-drop required for operating the current regulator.

If the input of the measuring amplifier is connected into the bridge diagonal in series with a low measuring voltage, especially a thermocouple element, it is advisable for the bridge resistors to be so rated that the operating voltage of the bridge is of the same order of magnitude or the next higher order of magnitude as that of the maximum measuring voltage. If for example a thermocouple element for temperatures of approximately 2000°C produces a voltage of 80 mV, the bridge voltage can be approximately 100 to 200 mV.

In particular, the bridge circuit may have a temperature-responsive resistor in each of two diagonally opposite branches. These resistors each have an optimum size for particular thermocouple elements. Since the other resistors of the bridge circuit must be of the same size, the overall resistance of the bridge and, with a predetermined current, the bridge voltage too, are thus established. Even with very small bridge currents, the temperature-responsive compensating resistors can be selected in the optimum manner with the aid of the invention.

In a preferred embodiment, the current regulator is controlled by a comparator which compares the voltage-drop at the bias resistor with a fixed reference voltage. The bias resistor is then used not only for raising the voltage level in the bridge, but also as a measuring resistor for controlling the current regulator. The comparator may be a differential amplifier for example.

The current regulator may consist of a simple transistor. Preferably however use is made of two transistors in a Darlington arrangement, in order to carry out a regulating operation in which the resistance is as low as possible.

Figure 2:
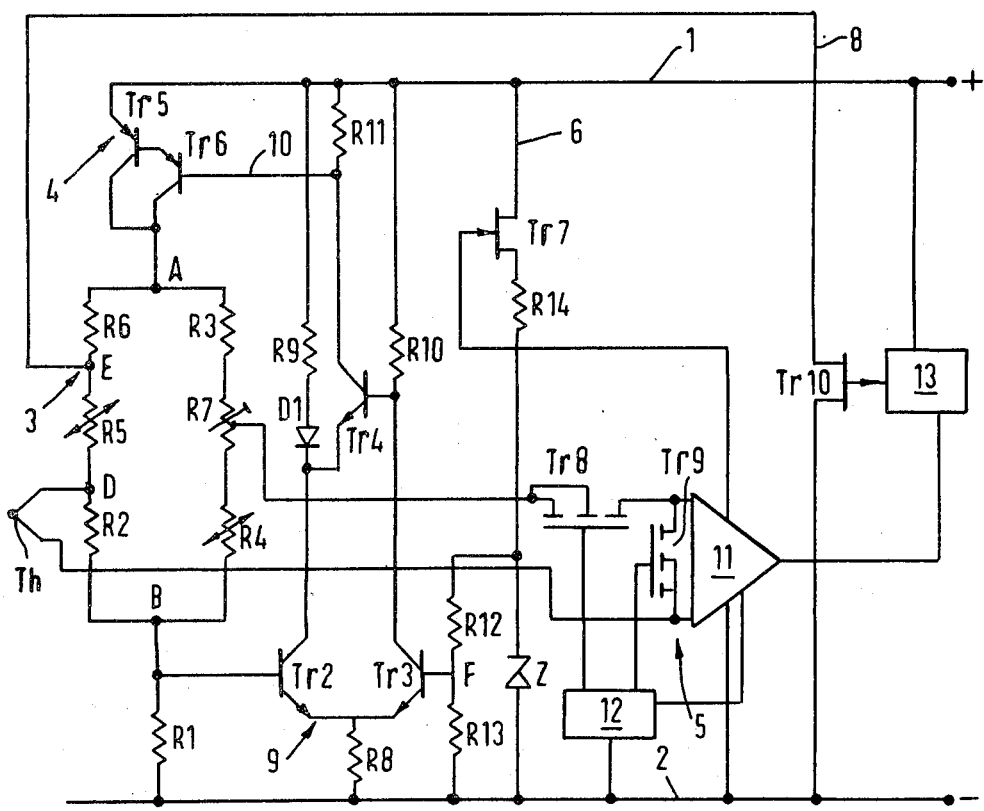

The invention will now be described in greater detail by reference to arrangements illustrated in the drawing, in which:

FIG. 1 is a block circuit diagram of the measured-value transducer of the invention, and FIG. 2 illustrates a circuit in greater detail.

Two D.C. voltage supply leads 1 and 2, which should have a positive (+) and negative (−) potential, are provided. These two conductors may themselves constitute the two lines of a two-line telemetering system. They may however be connected to such two-line telemetering system by way of any suitable transformer (e.g. an oscillator and transformer). The voltage between these two conductors 1 and 2 is not stabilized. A bridge circuit 3 is connected by its junction A to the conductor 1 by way of a current regulator 4 in the form of a transistor Tr1, and by its junction B to the conductor 2 by way of a bias resistor R1. The bridge circuit has two diagonally opposite branches each having a fixed resistor R2 and R3, a third branch with a temperature-responsive resistor R4 and a fourth branch in which are a temperature-responsive resistor R5 and a fixed compensating resistor R6. One of the diagonal points C is directly connected to the first input of an amplifier 5, and the other diagonal point D is connected by way of a measuring sensor in the form of a thermocouple element Th to the other input of this amplifier 5. This amplifier is likewise connected by its leads 6 and 7 between the supply conductors 1 and 2. The amplifier 5 has an output which controls a transistor Tr11 contained in a lead 8. The lead runs from a point E between the temperature-responsive resistor R5 and the compensating resistor R6 of the bridge circuit 3, to the conductor 2.

Connected to the junction B is an input of a comparator 9, the other input of which is located at a point F which is kept at a reference voltage $U_r$ which is fixed in relation to the supply conductor 2. By way of a lead 10, the comparator controls the current regulator 4 in such manner that the voltage-drop U1 at the bias resistor R1 is constant and equal to the reference voltage $U_r$. This voltage is so selected that the entire bridge circuit 3 is approximately at the level of the bias voltage of the inputs of the amplifier 5.

The mode of operation is then as follows. A small constant partcurrent $I_1$ for supplying the amplifier 5 is tapped off from the full current I flowing through the conductor 1. The rest of the current flows through the current regulator 4 and at the point A divides into the branch currents $I_2$ and $I_3$. The branch current $I_2$ is again divided at point E into a compensating current $I_4$ and a part-current $I_5$. The two currents $I_3$ and $I_5$ unite at point B and flow together as a summated current $I_6$ through the bias resistor R1. The compensating current $I_4$ flows through the lead 8 and the transistor Tr11 to the supply conductor 2. Combination of the compensating current $I_4$, the constant bridge current $I_6$ and the supply current $I_1$ again results in the total current I.

Since the supply current $I_1$ is practically constant and the summated current $I_6$ is kept constant with the aid of the regulator 4, there results a constant current constituent $I_1 + I_6$, which may be 4 mA when applied directly to a customary two-line system. The variable constituent which is represented by the compensating current $I_4$ depends upon the thermoelectric voltage delivered by the thermocouple element Th. The bridge circuit 3 is so tuned that, for a given reference temperature, the diagonal voltage and the thermoelectric voltage are equal but of opposite sign, and the amplifier 5 therefore allows no compensating current $I_4$ to flow. If the temperature rises, the amplifier 5 receives a corresponding input voltage which produces an associated compensating current $I_4$ which corresponds to a state of equilibrium associated with this temperature.

In the arrangement shown in FIG. 2, the same reference symbols as in FIG. 1 are used for like components. Additionally provided in the bridge circuit is an adjusting resistor R7 with the aid of which the reference temperature can be set.

The comparator 9 is a differential amplifier with two transistors Tr2 and Tr3 which have a common emitter resistor R8. The base of the transistor Tr2 is connected to the point B, and the base of the transistor Tr3 to the point F. The current regulator 4 is controlled with the aid of a transistor Tr4, the customary resistors R9, R10 and R11 and a diode D1. The current regulator here consists of two transistors Tr5 and Tr6 which are connected in a Darlington arrangement.

The reference voltage at the point F is produced with the aid of a voltage divider consisting of the resistors R12 and R13 which tap the voltage at a Zener diode Z. The latter is in series with a transistor Tr7 and a resistor R14 which keep the current in the lead 6 constant. Tr The measuring amplifier 5 has an A.C. voltage amplifier 11 which is likewise supplied with the voltage drop at the Zener diode Z. A field-effect transistor Tr8 is provided in the connecting lead between the diagonal point C and one of the inputs of the amplifier 11. A second field-effect transistor Tr9 bridges the two input leads. These transistors are alternately triggered by a multi-vibrator 12 so that the D.C. voltage bridge signal is converted into an A.C. voltage. The output signal of the A.C. voltage amplifier 11 is synchronously detected and is filtered by a filter 13 which in turn controls the compensating current in the lead 8 through a transistor Tr10.

In an arrangement in accordance with the invention, a voltage of approximately 10 V was available between the supply conductors 1 and 2. The total bridge current $I_6$ was 50 µA. The resistors were so rated that the bridge operating voltage was rather more than 100 mV and the point B was raised to approximately 3 V.

I claim:

1. A measuring-transducer circuit arrangement suitable for a two-line telemetering system, the arrangement comprising: a bridge circuit having a compensating resistor and having two bridge diagonals; a current regulator; a resistor arrangement including at least one resistor; said current regulator and said resistor arrangement being connected in a series path with one of said bridge diagonals, said current regulator being directly connected on one side of said bridge circuit adjacent to said compensating resistor and said resistor arrangement being directly connected to the other side of said bridge circuit; a measuring amplifier connected to the other of said bridge diagonals and having an output; a circuit path connecting said output of said measuring amplifier to said compensating resistor and said measuring amplifier controlling a compensating current which in use flows in said compensating resistor; said current regulator being connected in a loop through which said compensating current flows; means to derive a control signal in dependence upon the voltage across said one resistor in said resistor arrangement and to supply said control signal to said current regulator to maintain said voltage substantially constant; and a direct voltage supply common to both said bridge circuit and said measuring amplifier.

2. A measuring-transducer circuit arrangement according to claim 1 wherein said one resistor arrangement comprises only said resistor.

3. A measuring-transducer circuit arrangement according to claim 1 wherein said means to derive a control signal comprises means to provide a fixed reference voltage, and a comparator for controlling said current regulator in dependence on the comparison of the voltage across said one resistor in said resistor arrangement with said reference voltage.

4. A measuring-transducer circuit arrangement according to claim 1 wherein said current regulator comprises two transistors connected in Darlington configuration.

5. A measuring-transducer circuit arrangement suitable for a two-line telemetering system, the arrangement comprising: a thermocouple element forming said measuring transducer; a bridge circuit including a compensating resistor and having two bridge diagonals; a current regulator; a resistor arrangement including at least one resistor; said current regulator and said resistor arrangement being connected in a series path with one of said bridge diagonals, said current regulator being directly connected on one side of said bridge circuit adjacent to said compensating resistor and said resistor arrangement being directly connected on the other side of said bridge circuit; a measuring amplifier connected in series with said thermocouple element to said other of said bridge diagonals and having an output; a circuit path connecting said output of said measuring amplifier to said compensating resistor and said measuring amplifier controlling a compensating current which in use flows in said compensating resistor; said current regulator being connected in a loop through which said compensating current flows; means to derive a control signal in dependence upon the voltage across said resistor in said resistor arrangement and to supply said control signal to said current regulator to maintain said voltage substantially constant; and a direct voltage supply common to both said bridge circuit and said measuring amplifier; said bridge circuit further including resistors of such values that the operating voltage of said bridge circuit is in the range of the same order of magnitude to the next higher order of magnitude as the maximum output voltage of said thermocouple element.

6. A measuring-transducer according to claim 5 wherein two of said resistors forming said bridge circuit are temperature-dependent resistors, said two resistors being disposed in respective diagonally opposite branches of said bridge circuit.

* * * * *